United States Patent [19]

Trenne et al.

[11] Patent Number: 5,632,221

[45] Date of Patent: May 27, 1997

[54] AMPHIBIOUS VEHICLE HAVING RETRACTABLE GROUND WHEELS

[76] Inventors: Myron Trenne, 37888 Turnberry Ct., Farmington Hills, Mich. 48331; Rodney J. Trenne, 2162 Sandlewood Dr., Shelby Township, MaComb County, Mich. 48316

[21] Appl. No.: 628,926

[22] Filed: Apr. 8, 1996

[51] Int. Cl.⁶ .................................................. B63B 35/00
[52] U.S. Cl. .................................................. 114/270; 114/344
[58] Field of Search .................................. 114/344, 270; 280/414.2, 414.1

[56] References Cited

U.S. PATENT DOCUMENTS

| | | | |
|---|---|---|---|
| 2,851,705 | 9/1958 | Smith et al. | 114/344 |
| 2,863,159 | 12/1958 | Bear | 114/344 |
| 3,421,472 | 1/1969 | Oberg | 114/270 |
| 3,618,149 | 11/1971 | Christensen | 114/344 |

*Primary Examiner*—Edwin L. Swinehart

[57] ABSTRACT

A high performance amphibious vehicle which includes a conventional hull, modified to mount a single steerable front wheel and two hydraulically driven rear wheels. The wheels are retractable between elevated positions above the hull waterline and lowered positions located below the hull. The rear wheels are powered by individual hydraulic motors that are connected to a pump in the hull, via hydraulic hoses that are routed through hollow tubular levers that support the wheels for adjustments between the retracted and lowered positions.

15 Claims, 5 Drawing Sheets

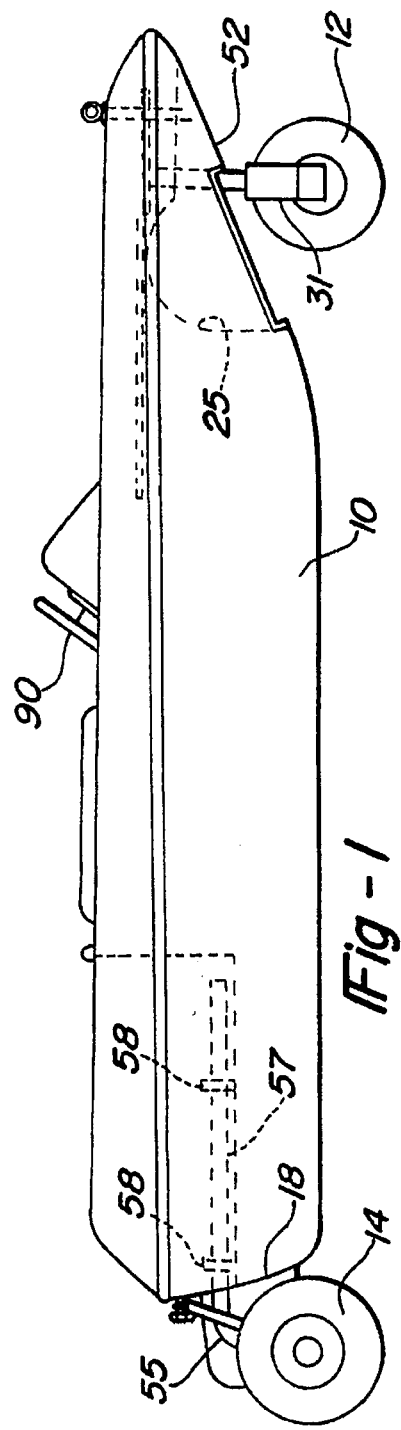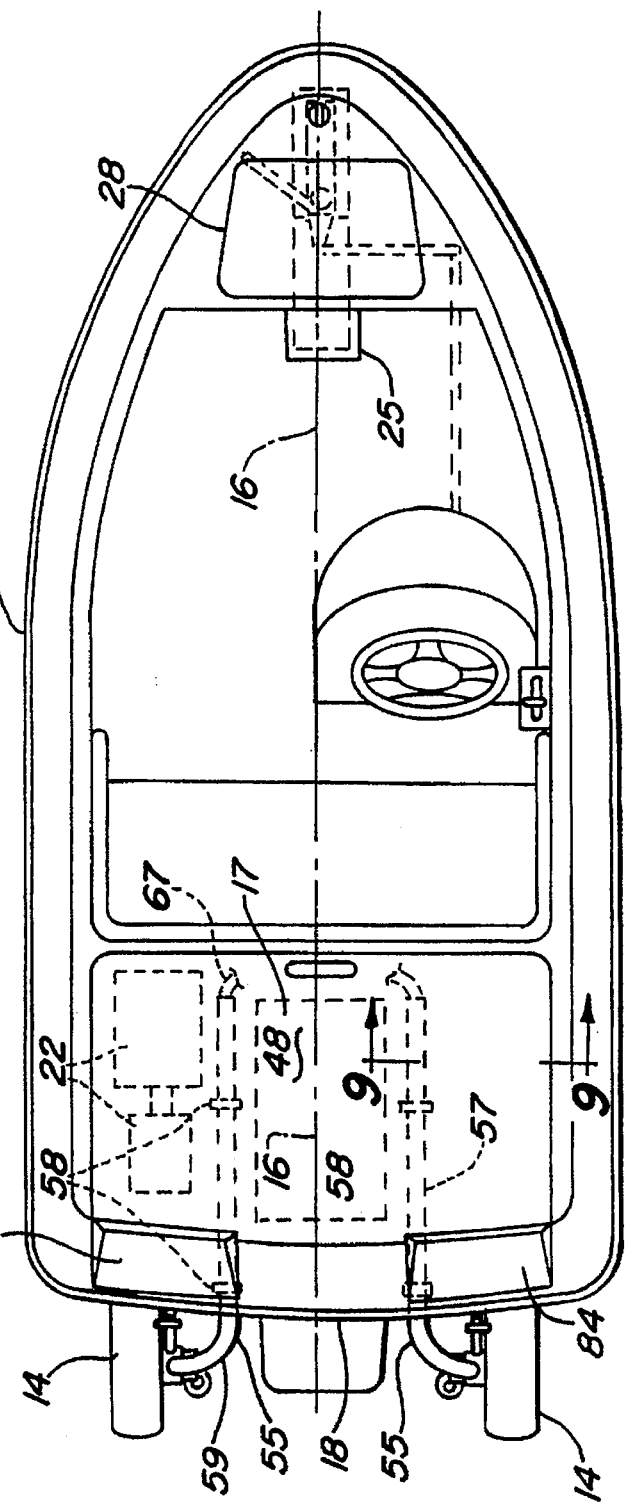

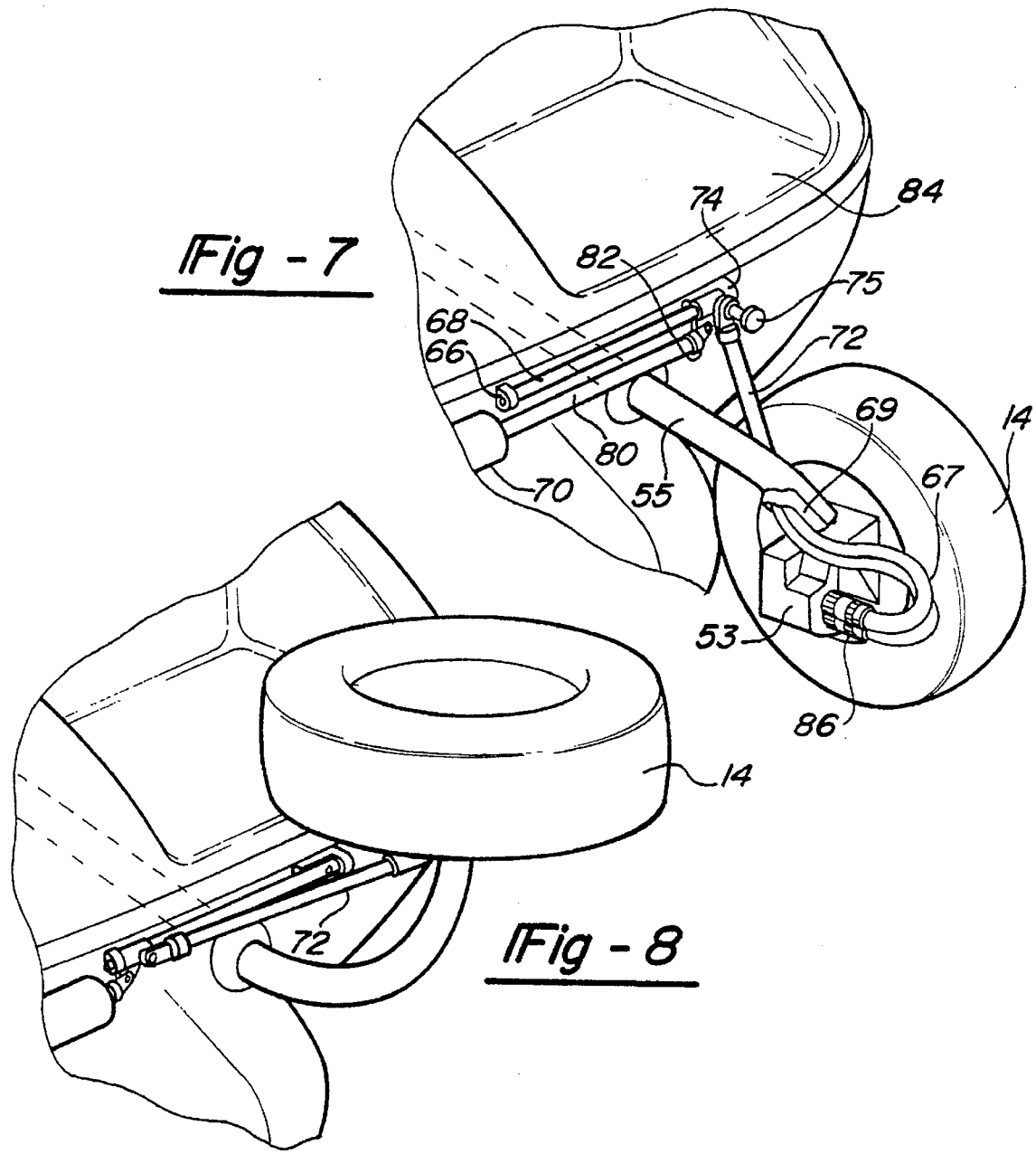
Fig - 7
Fig - 8
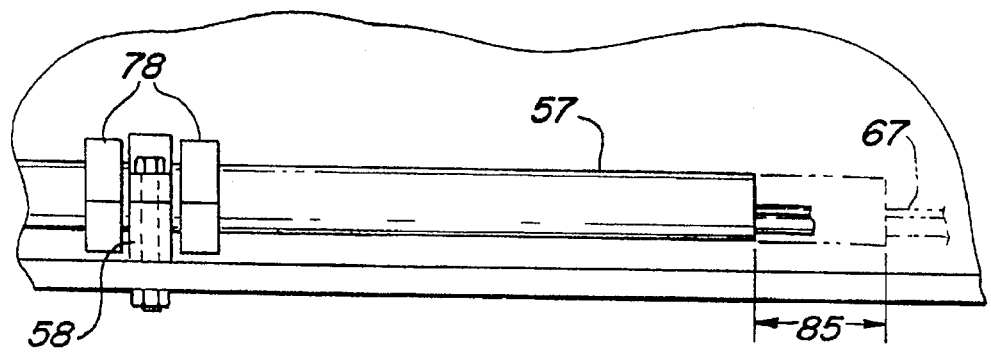
Fig - 9

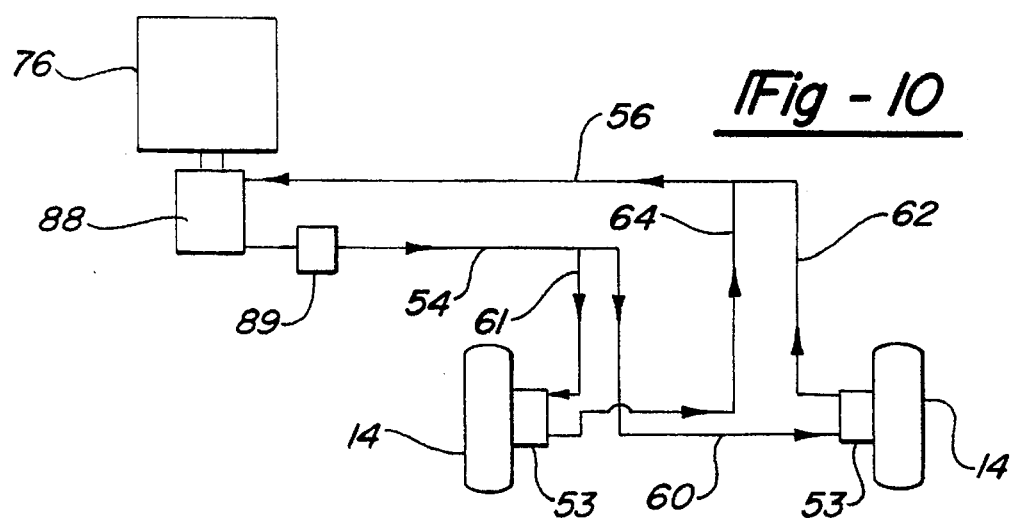
Fig - 10
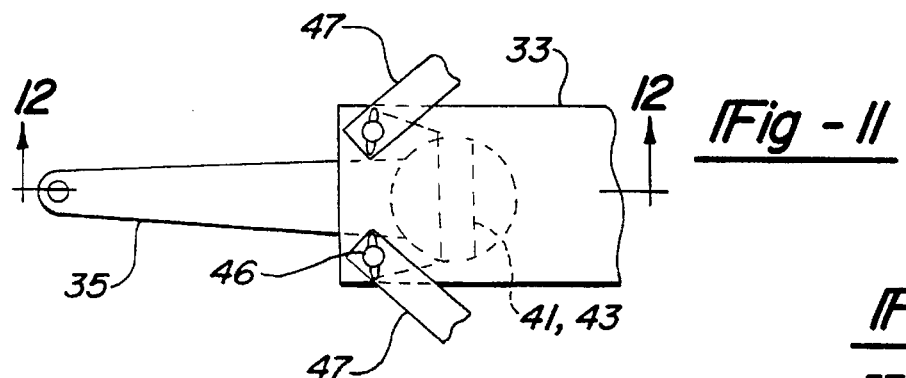
Fig - 11
Fig - 12
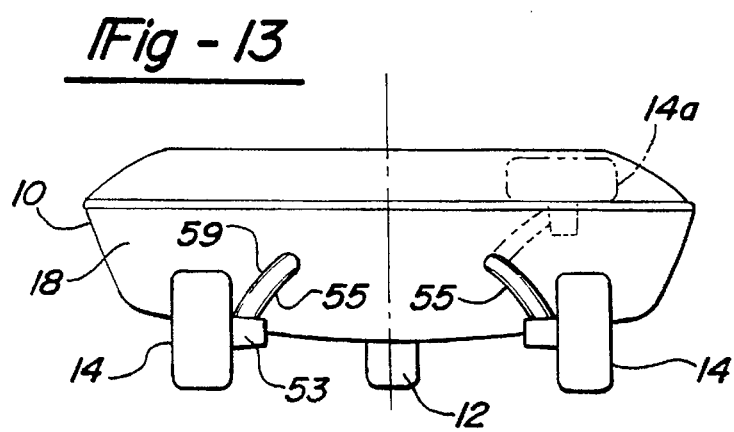
Fig - 13

5,632,221

AMPHIBIOUS VEHICLE HAVING RETRACTABLE GROUND WHEELS

BACKGROUND AND SUMMARY OF THE INVENTION

This invention relates to an amphibious vehicle, and particularly to a vehicle having ground wheels that can be raised or lowered, whereby the vehicle can be operated in water or on land.

Amphibious vehicles of various types are already well known in the art. For example, Baradi, U.S. Pat. No. 5,181,478 discloses an amphibious vehicle includes a hull having five wheels along each of its sides. The wheels can be retracted into cavities in the hull side walls by means of hydraulic cylinders. Each set of wheels is driven by a hydraulic motor, so that the vehicle can be steered by adjusting the relative speeds of the motors. The wheels on each side of the vehicle are linked together by drive chains, whereby all wheels on a given side of the hull rotate at the same speed.

Seligman, et al., U.S. Pat. No. 5,199,372 discloses an amphibious vehicle having two pair of wheels located along the side walls of a hull. Elevator mechanisms within the hull enable the wheels to be raised or lowered, whereby the vehicle can be supported in the water or on the land.

Doyon, U.S. Pat. No. 5,400,734 discloses an amphibious vehicle having a chassis located above three endless tread-type tracks, whereby the vehicle is enabled to climb out of the water onto a bank at the water's edge. Each track is driven by a hydraulic motor. Movement on dry land is accomplished by auxiliary wheels located alongside the tracks in operative connection to the hydraulic motors. Movement in the water is accomplished by an outboard motor.

The amphibious vehicle of the present invention utilizes a relatively simple wheel arrangement comprising only three ground wheels. There is a single front wheel that is steerable, and two rear wheels that are non-steerable. Each rear wheel is driven by a separate hydraulic motor, connected in a parallel hydraulic circuit which provides a differential for ease of turning the vehicle.

The single front wheel can be shifted between a retractable inactive position within a well in the bow of the vehicle hull and an exposed operative position extending below the hull. The wheel shifting mechanism has a telescopic feature that enables the front wheel to have relatively good ground clearance when it is in the operative position. The front wheel is stored in a relatively small size compact space in the well when it is in its retracted position.

Each rear wheel is suspended from the hull by means of a lever that is swingable on an axis that parallels the hull longitudinal axis, whereby each rear wheel can have an elevated retracted position above the waterline or a lowered operating position below the hull. Each rear wheel carries a hydraulic motor rigidly attached to the terminal end of the aforementioned wheel suspension lever, whereby the motors are at all times in operative connection to the respective rear wheels.

Each wheel suspension lever preferably comprises a hollow tubular structure of sufficient internal diameter to act as a conduit for the hydraulic hoses that supply pressurized hydraulic fluid to the associated motors. The hydraulic hoses are carried within the hollow tubular levers so that no additional openings or seals are needed in the stern to the external hydraulic motors. This feature somewhat simplifies the hydraulic system, while avoiding potential leakage points that could exist if the hydraulic hoses were routed in some other fashion.

Preferably each hollow tubular lever includes an elongated linear tube section extending through spaced bearings in the hull. The front end of each elongated linear tube section is captured fore and aft of the bearing to transmit forward and reverse thrust forces from the wheels to the hull.

A principal aim of the invention is to provide a relatively simple retractable wheel arrangement that utilizes an essentially standard commercially available hull having high performance in the water. A related aim is to provide the retractable wheel features without requiring extensive modification or redesign of the commercially available hull.

Further features and advantages of the invention will become apparent from the attached drawings and description of the illustrative embodiment of the invention.

BRIEF DESCRIPTION OF THE DRAWINGS

FIG. 1 is a side elevational view of an amphibious vehicle constructed according to the invention.

FIG. 2 is a top plan view of the vehicle of FIG. 1.

FIG. 7 is a fragmentary perspective view of a rear wheel assembly used in the vehicle of FIG. 1.

FIG. 8 is a view taken in the same direction as FIG. 7, but showing the wheel in an elevated retracted position.

FIG. 9 is a fragmentary top view of the wheel tube showing the clamps used to secure the tube to the boat hull.

FIG. 10 is a schematic diagram of a hydraulic circuit that can be used to operate hydraulic motors in the FIG. 1 vehicle.

FIG. 11 is a fragmentary view showing one embodiment of the vehicle steering mechanism.

FIG. 12 is a sectional view of the steering mechanism of FIG. 11 taken along line 12—12.

FIG. 13 is a rear end view of the vehicle of FIG. 1.

DETAILED DESCRIPTION OF A PREFERRED EMBODIMENT

Figure 3:
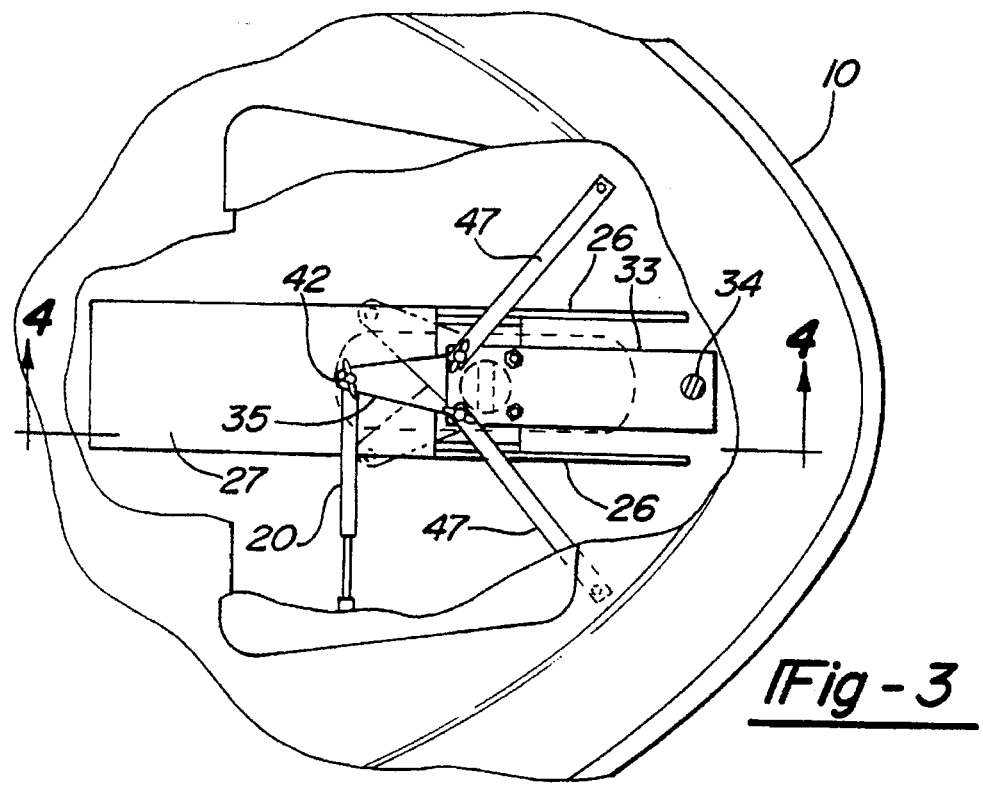
FIG. 3 is a plan view of a front steerable wheel assembly used in the vehicle of FIG. 1.

Turning now to the drawings, wherein like numerals refer to like structures, and particularly to FIGS. 1 and 2 of the drawings, there is shown an amphibious vehicle that comprises a hull 10 having a single front steerable wheel 12 and two rear wheels 14. Hull 10 is preferably a commercially available boat (hull) having desired features that make it seaworthy on the water, e.b., a fourteen foot boat marketed under the name Sea Rayder by the Sea Ray Company.

The commercially available craft has a jet drive water propulsion system powered by a 90 to 120 horsepower engine. Typically, the craft can reach speeds of forty miles per hour on the water. Jet drive boats commonly have a water tunnel in the underside of the hull, and a rotary impeller in the tunnel for pumping water along the hull longitudinal axis at high velocity, whereby a reactive force is produced for moving the boat forwardly or rearwardly; a deflector is located at the tunnel outlet to produce reverse thrust when needed. Since the impeller is located in a tunnel, the jet propelled boat is ideal for shallow water; such a boat can be driven onto a beach without damaging a conventional propeller.

In the boat (vehicle) shown in FIGS. 1 and 2, the engine 48 for driving the impeller is located on the longitudinal centerline 16 of the hull in a compartment 17 near the stern of the hull. The stern is defined by an upright transverse wall 18 that defines the rear end of the boat.

Figure 4:
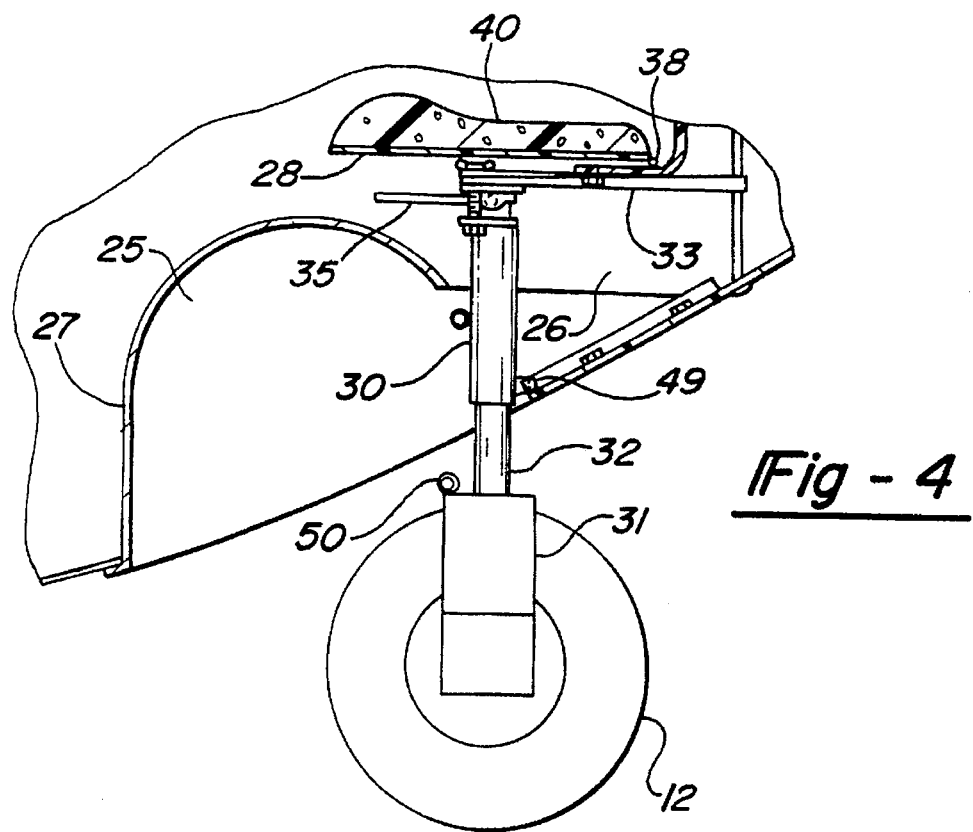
FIG. 4 is a fragmentary sectional view taken on line 4—4 of FIG. 3.
Figure 5:
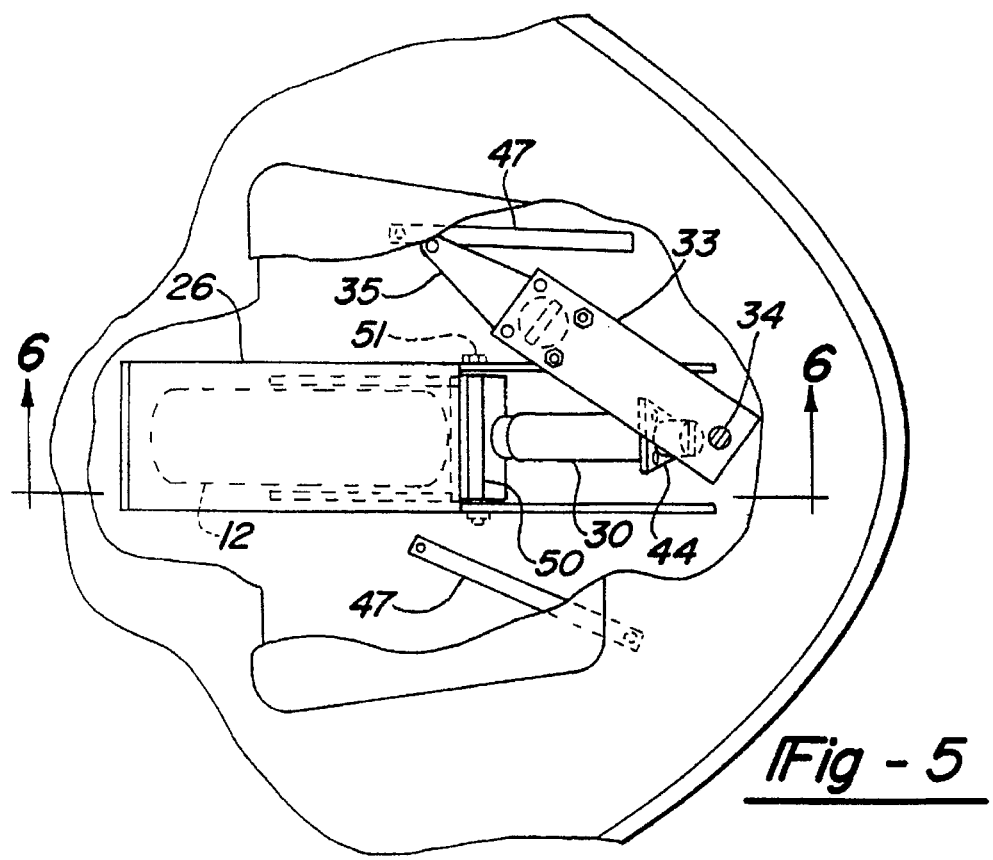
FIG. 5 is a view taken in the same direction as FIG. 3, but showing the front wheel in a retracted inactive position in the vehicle hull.
Figure 6:
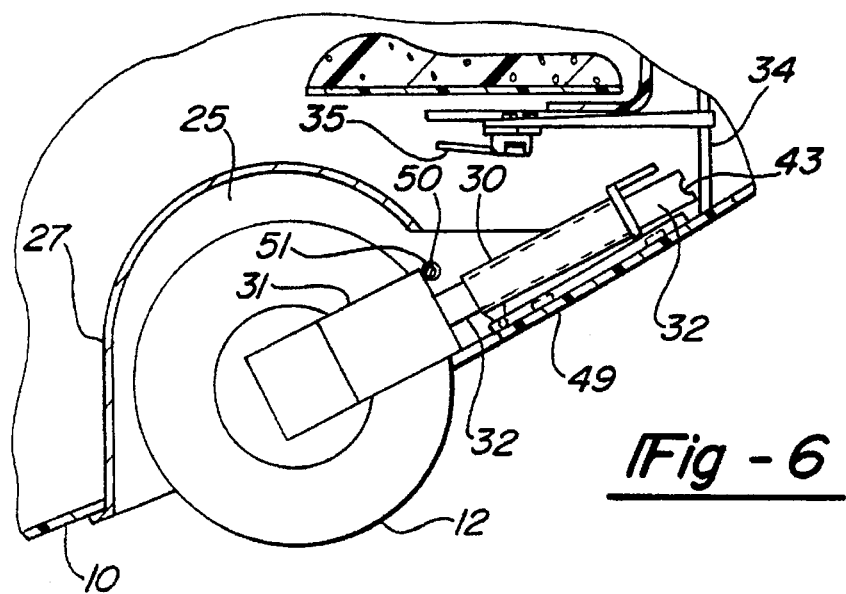
FIG. 6 is a fragmentary sectional view taken along line 6—6 of FIG. 5.

FIGS. 3 through 6 illustrate some features of the front wheel assembly for the amphibious vehicle. FIGS. 3 and 4 show the front wheel 12 in its exposed operative position located below the bow end 52 of the hull 10. FIGS. 5 and 6 show the front wheel 12 in a retracted inactive position elevated upwardly into a well 25 formed in the bow end of the vehicle.

Well 25 is comprised of two parallel vertical walls 26 and an arcuate interconnecting wall 27. The spacing between walls 26 is slightly grater that the width of the front wheel 12, such that the wheel has to be in the straight-ahead position in order to fit into the well (FIG. 6)

As an optional feature, an access plate shown as front seat cushion 40, carried upon seat plate 28, which is hingedly mounted above the well to normally overlie the wheel support mechanism in well 25; seat plate 28 is swingable upwardly around hinge axis 38 to provide access to the wheel support mechanism 30, hinged at 49 to the hull, whereby said sleeve has a forwardly inclined position as shown in FIG. 6 or (vertical) position as shown in FIG. 4. The open portion of well wall 26 is above the waterline. A wheel mounting yoke 31 is attached to a cylindrical shaft 32 that slidably extends through sleeve 30. Shaft 32 can rotate in the sleeve and also move linearly in the sleeve.

Shaft 32 is retained in its FIG. 4 upright position by means of an anchorage plate 33 that is swingably mounted on a post 34, whereby the plate can overlie shaft 32, as shown in FIGS. 3 and 4, or be swung to the side, as shown in FIGS. 5 and 6. Anchorage plate 33 carries a steering arm 35 that can swing around an axis 37 defined by a pivot pin 39 seated in a caster bearing mounted to plate 33, as shown best in FIG. 12. The steering arm carries a male clutch element (transverse rib) 41 that is adapted to fit into a female clutch element (notch) 36 in the upper end of shaft 32 when the anchorage plate 33 is in the FIG. 3 position.

Turning to FIG. 12, sleeve 30 has a plate 44 at its upper end that mounts two upstanding bolts 45. When the anchorage plate 33 is in its FIG. 3 position, bolts 45 can be extended through holes in plate 33 and secured by butterfly nuts 46. Sleeve 30 is thereby vertically secured, or anchored, at its upper end to anchorage plate 33. At the same time, the shaft 32 is operatively connected to steering arm by the interfit of clutch elements 41 and 36. In the FIG. 3 position, steering arm 35 is swingable around axis 37 so as to rotate shaft 32 to thereby accomplish a steering action. The free end of the steering arm is connected by a butterfly nut to a cable system to the existing steering wheel 90 (FIG. 1 and 2), such that the steering wheel is usable when the amphibious vehicle is on dry land.

Two swingable struts 47 can be employed to stabilize anchorage plate 33 in its FIG. 3 position. Bolts 45 can be used to connect struts 47 to plate 33. When it is desired to shift the wheel support mechanisms to its FIG. 6 inactive position, struts 47 are disconnected from plate 33. The plate 33 can be swung to one side, as shown in FIG. 6, whereby the wheel support can be swung around the hinge 49 axis to assume the retracted position in which wheel 12 is located in well 25. The buoyancy of the tire in the water helps lift the wheel to the retracted position.

Yoke 31 carries a tubular retainer 50 that registers with holes in walls 26 when the wheel is in its retracted position. A pin or bolt 51 can be extended through the holes and aligned tubular retainer 50 to lock the front wheel assembly in the FIG. 6 position. The pin (bolt) is removed when it is desired to return the wheel to the FIG. 4 active position engageable with the ground surface.

The slidable relation between shaft 32 and sleeve 30 is useful in that the shaft can slide downwardly in the sleeve to achieve a good ground clearance (FIG. 4), or upwardly in the sleeve to achieve a compact wheel storage (FIG. 6). The sleeve serves as a bearing for shaft 32 during wheel steering operations.

The mounting mechanisms for rear wheels 14 are best seen in FIGS. 1, 2, 7, 8, 9 and 13. Each rear wheel has a hydraulic motor 53 (FIG. 7) affixed to the free end of a tubular lever 55. Each lever 55 has a linear tube section 57 (FIG. 9) extending through bearings 58 (FIGS. 1 and 2) in the hull, whereby each tube section 57 serves as a pivot shaft for the respective lever. Each lever further includes a second hollow section 59 extending angularly from tube section 57 outside the hull. The angular section 59 has its terminal end affixed to an associated hydraulic motor 53, as shown in FIG. 13, whereby the levers can be swung around their pivots to raise or lower the wheels 14. Linear tube sections 57 are parallel to the hull longitudinal centerline 16. Tube sections 57 are secured fore and aft by thrust clamps 78 on either side of bearing 58.

FIGS. 1, 2, 7, and 13 show the rear wheels in their lowered operating positions. FIG. 8 shows one of the rear wheels in its retracted (elevated) position. In FIG. 13, one of the rear wheels in shown in its elevated position, by the dashed lines 14a. Each hydraulic motor 53 is of conventional fixed displacement gerotor design capable of clockwise (CW) and counter clock wise (CCW) rotation by reversing the pressure/flow of hydraulic fluid through the motor.

Hydraulic fluid is supplied to the motor via hoses 67 that are routed through the hollow tubular lever 55. As shown in FIG. 7, the hoses extend out of the lever through an opening 69 in the tube, and thence to connections 86 with motor 53.

A conventional variable displacement piston pump is provided in hull 10 for supplying hydraulic fluid to motors 53. The pump is driven by a 20 horsepower auxiliary engine placed in the hull; such engine being speed governed, air cooled, and sharing the fuel tank, battery and throttle control of the primary engine. A secondary ignition key starts and stops the auxiliary engine.

To control the hydraulic flow between the pump and hydraulic motors 53, the system shown in FIG. 10 comprises engine 76 that drives a variable displacement pump 88; a foot pedal 89 is mechanically connected via a cable to the swash plate of the pump to vary the pump output and the direction of the flow to the motors 53 (hence the direction of the vehicle). Fluid is forced through conduit 54, which bifurcates into conduits 60 and 61 which in turn go to different rear wheels. Return conduits 62 and 64 merge into conduit 56 to complete the hydraulic circuit. Braking for the vehicle is accomplished by returning the foot control pedal toward the neutral swash plate position which blocks hydraulic flow and creates a braking force in wheel motors 53.

The rear wheels are shifted from the operating position to the retracted (elevated) position by double acting hydraulic cylinders. The power source for the cylinders is an electric motor driven pump located in the hull with solenoid control valves to reverse cylinder motion and provide hydraulic locking of the cylinders in the de-energized state. Both the power source and the cylinders are conventional marine components used for lifting outdrive propulsion units.

The body of the cylinder is secured horizontally at the stern of the hull at connection 74 and 66, and the ram is connected to a slider 75 which is free to move along the slider bar 68. The slider bar 68 is rigidly mounted to the stern in a horizontal plane parallel to the cylinder ram and perpendicular to the tube section 57.

A strut 72 connects the terminal end of section 59 to the slider 75. The strut ends are free to pivot on their mounts.

FIG. 7 shows the wheel in the operating position with the cylinder extended and strut 72 essentially vertical. This embodiment provides an automatic lock down feature for the wheel in the operating position and supports load forces from the wheel to the stern via the strut 72, the slider 75 and the rigidly mounted slider bar 68.

FIG. 8 shows the wheel in the retracted (elevated) position with the cylinder retracted and strut 72 essentially horizontal. The hydraulic locking feature of the solenoid control valves secures the wheel in the elevated position. The horizontal profile of the wheel in the elevated position features a good appearance that blends with hull line while preserving the purpose of the boarding steps 84 molded as part of the existing hull.

By way of summarization, the drawings show an amphibious vehicle that comprises a conventional hull, modified only in minor respects to accommodate the front steerable wheel and the two powered rear wheels. Each rear wheel is powered by an individual hydraulic motor when the ground wheels are operative (lowered).

The retracting mechanism for each rear wheel includes a tubular lever 55 that serves as a conduit for the hydraulic hoses needed for supplying hydraulic fluids to the wheel motors. Each tubular lever comprises an elongated linear tube section 57 supported in spaced bearings 58.

The single front wheel 12 is a steerable wheel that can be lowered to an active position or raised to a retracted position in well 25. The wheel-support shaft 32 is slidable in sleeve 30, so that the shaft can be moved up in the sleeve when the wheel is retracted or down in the sleeve when the wheel is lowered into contact with the ground. This arrangement provides a relatively good ground clearance (FIG. 4), while minimizing the size of well 25.

The drawings show particular structural arrangements usable in practice of the invention. However, it will be apparent to those skilled in the art that the invention may be practiced is various forms and configurations.

What is claimed is:

1. An amphibious vehicle comprising a hull having a bow and a stern;

a single front steerable wheel proximate to said bow; support means for shiftably supporting said front wheel for movement between a retractable inactive position within the hull and an exposed operative position located below the hull; said shiftable support means for the front wheel comprises a sleeve pivotally connected to said hull, and a wheel support yoke having a cylindrical shaft extending through said sleeve; said support means further comprised of an anchorage means for locking said sleeve in a fixed upright opposition when the front wheel is in its exposed operative position; said anchorage means comprised of an anchorage plate swingable in a horizontal plane to overlie said sleeve when said sleeve is in its fixed upright position.

2. The amphibious vehicle of claim 1, wherein said cylindrical shaft is rotatable and linearly slidable in said sleeve.

3. The amphibious vehicle of claim 2, and further comprising a steering arm connectable to said shaft when said sleeve is in a fixed upright position.

4. The amphibious vehicle of claim 2, wherein said shiftable support means comprises an anchorage means for locking said sleeve in a fixed upright position when the front wheel is in its exposed operative position; said anchorage means being a plate swingable in a horizontal plane to overlie said sleeve, and at least one bolt nut means for releaseably joining said plate to said sleeve, whereby the sleeve is stabilized in its upright position.

5. The amphibious vehicle of claim 4, and further comprising a steering arm rotatably mounted on said anchorage plate for rotation in a horizontal plane; and mating clutch elements carried by said cylindrical shaft and said steering arm so that when said sleeve is in its upright position and anchored, the steering arm can be turned to rotate said shaft and the associated wheel support yoke.

6. The amphibious vehicle of claim 1, wherein said shiftable support means for the front wheel comprises a sleeve pivotally connected to said hull, and a wheel support yoke having a cylindrical shaft extending through said sleeve; said sleeve having an upright position when the front wheel is in its exposed operating position; said sleeve having a forwardly inclined position within the hull when the front wheel is in its retracted inactive position.

7. The amphibious vehicle of claim 6, and further comprising means for locking said sleeve in its forwardly inclined position; said locking means comprising a tubular retainer carried by said yoke, and a locking bolt extendable through said tubular retainer.

8. The amphibious vehicle of claim 1, and further comprising a wheel accommodating well in said hull at the bow, said well being adapted to receive said front wheel when said front wheel is shifted to its retracted inactive position; said well comprising two parallel vertical walls spaced apart by a distance slightly greater that the width dimension of the front wheel so that the wheel fits snugly in the well.

9. The amphibious vehicle of claim 8, wherein said shiftable support means for the front wheel comprises a sleeve pivotally connected to said hull, and a wheel support yoke having a cylindrical shaft extending through said sleeve; said sleeve having an upright position when the front wheel is in its exposed operating position; said sleeve having a forwardly inclined position when it is in its retracted position within the well.

10. The amphibious vehicle of claim 9, and further comprising means for locking said sleeve in its forwardly inclined position; said locking means comprising a tubular retainer carried by said yoke, and a locking pin extendable through the parallel walls of said well and the tubular retainer, whereby said sleeve is releasably locked in its forwardly inclined position.

11. The amphibious vehicle of claim 1, and further comprising a hydraulic motor connected to rear wheel, whereby the rear wheels act as drive wheels for the vehicle when the rear wheels are in their lowered positions.

12. The amphibious vehicle of claim 1, wherein each lever is tubular; said vehicle comprising hydraulic hoses extending through the tubular levers for flowing hydraulic fluid through the associated hydraulic motors.

13. The amphibious vehicle of claim 1, wherein the stern of said hull comprises an upright rear wall extending transverse to the hull longitudinal axis; each rear wheel having a hydraulic motor connected to said wheel for driving the respective wheel; each said lever comprising a hollow tube and hydraulic hose means extending through said tube for supplying hydraulic fluid to the associated motor; each hollow tube comprising a first tubular section extending through said upright rear wall to define a swing axis for the respective lever; each hollow tube further comprising a second hollow section extending angularly from said first tubular section; said second hollow section having a rigid connection with the associated hydraulic motor.

14. The amphibious vehicle of claim 13, and further comprising two spaced bearings in said hull for swingably supporting each tubular lever; each said first tubular section extending through the associated spaced bearings so that a forward end thereof is located forwardly of the bearings; and clamping means for axially holding the forward end of each tubular lever in a fixed position to transmit forward and reverse drive thrust to the hull.

15. The amphibious vehicle of claim 1, wherein each rear wheel has a rotational plane; the rotational plane of each rear wheel being substantially horizontal above the water line when the respective rear wheel is in its retracted position, and substantially vertical when the respective rear wheel is in its lowered operating position.

* * * * *